Patented Aug. 27, 1929.

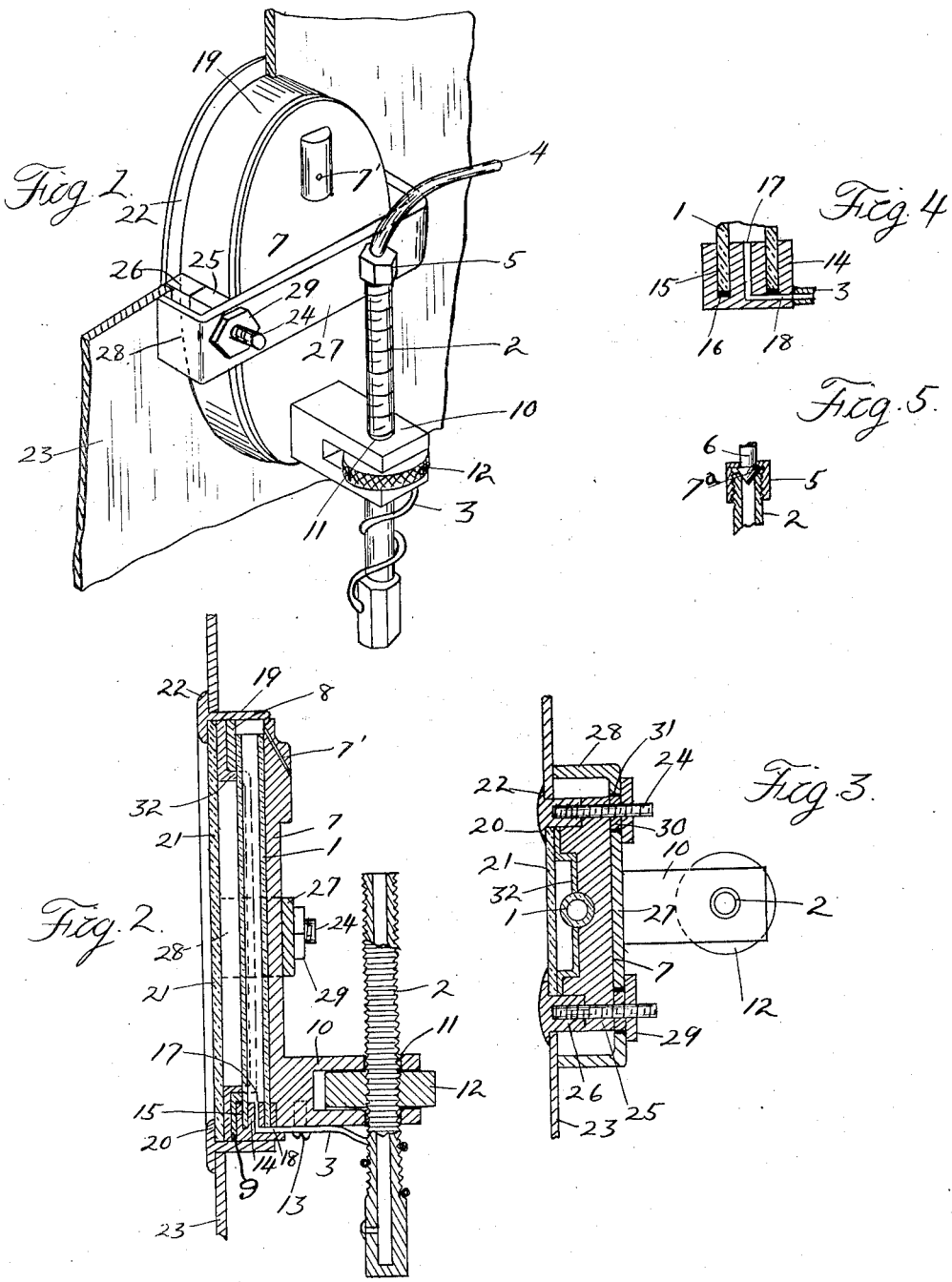

1,726,495

UNITED STATES PATENT OFFICE.

HORACE W. KING, OF ANN ARBOR, MICHIGAN, ASSIGNOR TO KING-SEELEY CORPORATION, OF ANN ARBOR, MICHIGAN, A CORPORATION OF MICHIGAN.

GAUGE.

Application filed June 27, 1921. Serial No. 480,654.

The invention relates to gauges and is particularly applicable to gauges for use upon motor vehicles to indicate the depth of liquid fuel in the tanks. One of the objects of the invention is to provide a gauge comprising a U tube in which one of the legs of the U is adapted to be raised or lowered so that the normal level of the indicating liquid in the other leg can be adjusted to zero position. Another object is the provision of a U tube in which the tube connecting the legs of the U is a capillary tube whereby movement of the indicating liquid in the U tube is gradual, and furthermore, the indicating liquid can be retained in the U tube during shipment by closing the open end of one leg of the U when the liquid is contained in this leg and in the capillary tube. Further objects of the invention reside in the novel features of construction and combinations and arrangements of parts as more fully hereinafter set forth.

In the drawings:

Figure 1 is a perspective view of a gauge embodying my invention and applied to the dash on a motor vehicle, a portion of the dash being broken away;

Figure 2 is a central longitudinal section therethrough;

Figure 3 is a central transverse section therethrough;

Figure 4 is an enlarged section taken adjacent the bottom of the transparent tube showing the manner of securing the transparent tube to the cap at its lower end;

Figure 5 is a section showing the means for closing the open end of one of the legs of the U during shipment of the gauge.

The U tube of the gauge comprises the transparent tube 1 which is preferably formed of glass, the externally threaded tube 2 and the tube 3 connecting into the lower ends of the tubes 1 and 2, the latter tubes forming the legs of the U. The tubes 1, 2 and 3 are fixedly secured to each other and form a unit construction of U-tube. In the present construction, the upper end of the transparent tube 1 is open and communicates with the atmosphere while the upper end of the tube 2 is adapted to be connected to the air pipe 4 by means of the coupling 5. Since the U tube is filled with the indicating liquid to substantially the correct amount before the gauge is shipped, it is necessary to prevent this indicating liquid from flowing out of the U tube during shipment. This is accomplished by making the tube 3 a capillary tube and by removing the air pipe 4 and inserting the plug 6 having the conical end $7^a$ for seating upon the upper end of the tube 2 to form an air tight seal. Before tightening the coupling 5 to form an air tight seal at the upper end of the tube 2, the liquid is drained out of the transparent tube 1 and into the tube 2 and capillary tube 3 after which the plug 6 is firmly seated upon the upper end of the tube 2. Due to the capillary action exerted by the capillary tube 3, the indicating liquid cannot escape into the transparent tube 1 and out through its open upper end. Or the gauge may be filled by plugging the upper end of the transparent tube 1 and putting the liquid in the upper end of the tube 2, and placing the plug 6 before releasing the end of the tube 1. In this manner the compression of air in tube 1 prevents the liquid rising in this tube.

It is highly desirable to maintain the normal level of the indicating liquid in the transparent tube opposite the zero indication upon the scale at the side of this tube, and since it is difficult to have the exact amount of liquid in the U tube, I have provided a simple construction for securing the desired level of the indicating liquid in the transparent tube. In detail, 7 is the supporting back of the gauge which has the forwardly projecting lugs 8 and 9 at its upper and lower ends respectively and through which extend aligned apertures for receiving the transparent tube 1. 10 is a laterally extending bifurcated arm at the lower end of the supporting back 7 in which the bifurcations have the aligned apertures 11 through which the tube 2 extends. For raising and lowering this tube the nut 12 is provided between the bifurcations and engaging the external threads upon the tube. The end of the capillary tube connecting into the lower end of the transparent tube 1 is secured in fixed position by a suitable means such as the screw 13, and to permit of the raising and lowering of the tube 2 by means of the nut 12, the capillary tube is coiled around the lower portion of the tube 2 and is made flexible. Thus with this construction, if the amount of indicating liquid in the U tube is not sufficient to bring its normal level in the transparent tube to a height opposite the zero indication, the nut 12 can be rotated to raise the tube 2 until the desired normal level is secured. If the amount of indicating liquid is too great, it is apparent that the normal level thereof in the transparent tube can be lowered to a height opposite the zero indication by lowering the tube 2 through the nut 12.

For the purpose of securing a liquid tight seal at the lower end of the transparent tube 1 there is the cap 14 which has the annular groove 15 for receiving the lower end of the transparent tube and for also receiving any suitable sealing material 16. This cap has the axial bore 17 which communicates with the interior of the tube 1 and connects into the lateral bore 18 which communicates with the capillary tube 3, the latter being permanently secured to the cap in any suitable manner.

In order to provide a gauge which may be easily manufactured and readily assembled upon the dash of a motor vehicle and at the same time will prevent dust from entering the upper end of the transparent tube, the cover 19 is provided, this cover telescoping over the supporting back 7 and having a close fit with the sides of the latter. This cover has the inwardly extending lateral flange 20 for clamping the glass 21 against the supporting back and also has the outwardly extending lateral flange 22 for engaging the outer side of the dash 23. The bore 7' in the supporting back 7 and leading to the aperture in the upper lug 8 above the transparent tube assures communication of the transparent tube with the atmosphere. To secure the supporting back and cover to each other studs 24 are provided which studs extend through lugs 25 upon opposite sides of the supporting back and threadedly engage lugs 26 upon opposite sides of the cover 19. To clamp the gauge to the dash there is the U-shaped clamping plate 27 which extends over the rear face of the supporting back 7 and has the legs 28 adapted to engage the inner side of the dash 23. This clamp is secured in place by means of the nuts 29 which threadedly engage the studs 24, and to prevent rotation of the studs when screwing the nuts 29 on or off, the nuts 30 are provided fixedly secured to the studs and adapted to enter correspondingly shaped apertures 31 in the clamp.

As shown in the present construction, the means for indicating either the height or the number of gallons of the liquid fuel in the tank, comprises the plate 32 upon the front face of the supporting back 7 and provided with an elongated aperture in which the transparent tube 1 lies. Suitable indications are provided upon this plate adjacent to the transparent tube.

Another feature of my invention resides in the use of acetylene tetrabromide as the indicating liquid in the gauge. This gauge having a U tube which is formed partly of glass and partly of metal, requires an indicating liquid which does not corrode or act on the metal in any way. Furthermore, since the gauge is subjected to freezing temperatures as well as other temperatures, it is essential that the liquid will not freeze nor volatilize. Acetylene tetrabromide does not corrode or act on the metals in any way and does not freeze nor volatilize at ordinary air temperatures and furthermore has a high specific gravity (3.0). Moreover, it is comparatively cheap and easy to manufacture and is not poisonous or dangerous to handle. This liquid is preferably colored so that its height in the transparent tube can be more readily seen.

What I claim as my invention is:

1. In a gauge, the combination with a support having a bifurcated laterally extending arm with aligned apertures in its bifurcations, of a transparent tube mounted upon said support, an externally threaded tube extending through the apertures in said bifurcations, a flexible tube connecting into the lower ends of said transparent and externally threaded tubes, and a nut between said bifurcations and threadedly engaging said externally threaded tube.

2. In a gauge, the combination with a gauge support, of a gauge comprising a supporting back, a cover having a lateral flange for engagement with one side of said gauge support, a clamping plate engageable with the other side of said support and cooperating with said lateral flange for securing said gauge to said gauge support, studs for securing said supporting back to said cover, said studs having polygonal portions intermediate their ends for engagement in correspondingly shaped apertures in said clamping plate, and nuts threadedly engaging said studs for securing said clamping plate against said gauge support.

3. In a gauge the combination with, a support therefor of a transparent tube mounted upon said support, a second tube also mounted upon said support, a flexible capillary tube connected into the lower ends of said transparent and second tubes, said second tube being adapted to contain an indicating liquid, means mounted upon said support for raising and lowering one of said first mentioned tubes relative to the other, and means engageable with said second tube prior to installation of the gauge and cooperating with said capillary tube for retaining the indicating liquid in said second tube.

4. A gauge having in combination a pair of hollow members, a flexible capillary tube connecting into said hollow members, said tube and hollow members being adapted to receive a liquid and one of said hollow members having a normally open end, and closure means for said open end for cooperating with said capillary tube to retain, prior to installation of the gauge, the liquid within said hollow member having the normally open end.

In testimony whereof I affix my signature.

HORACE W. KING.